(12) United States Patent
Kim et al.

(10) Patent No.: US 11,483,505 B2
(45) Date of Patent: Oct. 25, 2022

(54) IMAGE SYNCHRONIZATION DEVICE AND IMAGE INFORMATION GENERATION APPARATUS INCLUDING THE SAME

(71) Applicant: SK hynix Inc., Gyeonggi-do (KR)

(72) Inventors: Chang Hyun Kim, Seoul (KR); Wan Jun Roh, Gyeonggi-do (KR); Doo Bock Lee, Seoul (KR); Seung Hun Lee, Gyeonggi-do (KR); Jae Jin Lee, Gyeonggi-do (KR); Chun Seok Jeong, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 286 days.

(21) Appl. No.: 16/769,830

(22) PCT Filed: Jun. 14, 2018

(86) PCT No.: PCT/KR2018/006691
§ 371 (c)(1),
(2) Date: Jun. 4, 2020

(87) PCT Pub. No.: WO2019/088389
PCT Pub. Date: May 9, 2019

(65) Prior Publication Data
US 2021/0377483 A1    Dec. 2, 2021

(30) Foreign Application Priority Data
Nov. 6, 2017  (KR) .................. 10-2017-0146479

(51) Int. Cl.
*H04N 5/376*  (2011.01)
*H04N 5/369*  (2011.01)
(Continued)

(52) U.S. Cl.
CPC .............. *H04N 5/3765* (2013.01); *H04N 5/05* (2013.01); *H04N 5/341* (2013.01);
(Continued)

(58) Field of Classification Search
CPC ........ H04N 5/3765; H04N 5/05; H04N 5/341; H04N 5/36961; H04N 5/372;
(Continued)

(56) References Cited

U.S. PATENT DOCUMENTS 8,988,509 B1 * 3/2015  Macmillan ......... H04N 5/23238
                                              348/47
10,489,912 B1 * 11/2019  Brailovskiy ......... H04N 13/204
(Continued)

FOREIGN PATENT DOCUMENTS

JP    2008-252401 A    10/2008
JP    2012-124574 A    6/2012
(Continued)

OTHER PUBLICATIONS

Extended European Search Report issued by the European Patent Office dated May 27, 2021.

*Primary Examiner* — Lin Ye
*Assistant Examiner* — Tuan H Le
(74) *Attorney, Agent, or Firm* — IP & T Group LLP

(57) ABSTRACT

In accordance with an embodiment of the present disclosure, an image synchronization device includes a light emitting source configured to emit light at intervals of a predetermined time, a sampling phase calibration circuit configured to calibrate a sampling phase of each of the first image sensor and the second image sensor on the basis of a light emitting timing of the light emitting source and a delay calibration circuit configured to generate delay information on the basis of a result of comparison between first image information transmitted from the first image sensor and second image information transmitted from the second image sensor.

23 Claims, 13 Drawing Sheets

(51) Int. Cl.
*H04N 5/05* (2006.01)
*H04N 5/341* (2011.01)
*H04N 5/372* (2011.01)
*H04N 17/00* (2006.01)

(52) U.S. Cl.
CPC ......... *H04N 5/36961* (2018.08); *H04N 5/372* (2013.01); *H04N 17/002* (2013.01)

(58) Field of Classification Search
CPC ...... H04N 17/002; H04N 5/2258; H04N 5/04; H04N 5/247; H04N 5/3415; H04N 5/2256; G01S 17/89; G01S 7/4815; G01S 7/4863; G01S 17/18; G01S 17/42; G01S 17/87; G01S 17/931; B60Q 1/0023
See application file for complete search history.

(56) References Cited

U.S. PATENT DOCUMENTS

| | | | | |
|---|---|---|---|---|
| 2017/0041591 | A1* | 2/2017 | Korogi | H04N 13/296 |
| 2017/0324949 | A1* | 11/2017 | Chen | H04N 13/239 |
| 2019/0025432 | A1* | 1/2019 | Mano | G01S 7/4863 |
| 2021/0044743 | A1* | 2/2021 | Jo | H04N 5/2258 |

FOREIGN PATENT DOCUMENTS

| | | |
|---|---|---|
| JP | 2016-100823 A | 5/2016 |
| KR | 10-1457141 B1 | 10/2014 |
| KR | 10-2015-0107479 A | 9/2015 |
| KR | 10-1678691 B1 | 11/2016 |
| KR | 10-2017-0071173 A | 6/2017 |
| WO | 2015/142412 A2 | 9/2015 |

* cited by examiner

IMAGE SYNCHRONIZATION DEVICE AND IMAGE INFORMATION GENERATION APPARATUS INCLUDING THE SAME

CROSS-REFERENCE TO RELATED APPLICATION

This application is a national stage application of PCT/KR2018/006691 filed on Jun. 14, 2018, which claims priority of Korean patent application number 10-2017-0146479 filed on Nov. 6, 2017. The disclosure of each of the foregoing applications is incorporated herein by reference in its entirety.

TECHNICAL FIELD

Embodiments of the present disclosure relate to a technology for synchronizing image information generated by a plurality of image sensors.

BACKGROUND ART

An image sensor may refer to a device for converting an image seen by user's eyes into electric signals using a photoelectric device, converting the electric signals into digital signals, and outputting the digital signals as image data.

Different delays may occur in image data output from the image sensor due to a structure of the image sensor or a difference in transmission path of digital signals, such that the output image data may not be synchronized by a reception end. As a result, image information acquired at different times is used, resulting in acquisition of incorrect information.

DISCLOSURE

Technical Problem

Various embodiments of the present disclosure are directed to providing an image synchronization device and an image information generation apparatus including the same that substantially obviate one or more problems due to limitations and disadvantages of the related art.

The embodiment of the present disclosure relates to an image synchronization device for synchronizing image information provided from a plurality of image sensors, and an image information generation apparatus including the same.

Technical Solution

In accordance with an embodiment of the present disclosure, an image synchronization device includes: a light emitting source configured to emit light at intervals of a predetermined time; a sampling phase calibration circuit configured to calibrate a sampling phase of each of the first image sensor and the second image sensor on the basis of a light emitting timing of the light emitting source; and a delay calibration circuit configured to generate delay information on the basis of a result of comparison between first image information transmitted from the first image sensor and second image information transmitted from the second image sensor. The first image information is obtained when the first image sensor performs sensing and sampling of a light emitting signal of the light emitting source, and the second image information is obtained when the second image sensor performs sensing and sampling of a light emitting signal of the light emitting source.

In accordance with an embodiment of the present disclosure, an image information generation apparatus includes: a first image sensor and a second image sensor configured to respectively generate first image information and second image information; an image synchronization device configured to control the first image sensor and the second image sensor to respectively generate the first image information and the second image information using a light emitting source that emits light at intervals of a predetermined time, and synchronize a sampling phase of each of the first image sensor and the second image sensor with a light emitting timing of the light emitting source on the basis of the first image information received from the first image sensor and the second image information received from the second image sensor; and an image processor configured to process the first image information transmitted from the first image sensor having the synchronized sampling phase and the second image information transmitted from the second image sensor having the synchronized sampling phase.

In accordance with another embodiment of the present disclosure, an image information generation apparatus includes: a first image sensor and a second image sensor configured to respectively generate first image information and second image information; an image information storage circuit configured to store the first image information and the second image information; an image synchronization device configured to control the first image sensor and the second image sensor to respectively generate the first image information and the second image information using a light emitting source that emits light at intervals of a predetermined time, and generate delay information between the first image information and the second image information on the basis of a result of comparison between the first image information and the second image information; and an image processor configured to process the first image information and the second image information on the basis of the delay information.

It is to be understood that both the foregoing general description and the following detailed description of the present disclosure are exemplary and explanatory and are intended to provide further explanation of the invention as claimed.

Advantageous Effects

As is apparent from the above description, the embodiments of the present disclosure may synchronize image information transmitted from a plurality of image sensors.

DESCRIPTION DRAWINGS

The above and other features and advantages of the present disclosure will become readily apparent by reference to the following detailed description when considered in conjunction with the accompanying drawings wherein.

BEST MODE

In accordance with an embodiment of the present disclosure, an image synchronization device includes a light emitting source configured to emit light at intervals of a predetermined time, a sampling phase calibration circuit configured to calibrate a sampling phase of each of the first image sensor and the second image sensor on the basis of a light emitting timing of the light emitting source, and a delay calibration circuit configured to generate delay information on the basis of a result of comparison between first image information transmitted from the first image sensor and second image information transmitted from the second image sensor. The first image information is obtained when the first image sensor performs sensing and sampling of a light emitting signal of the light emitting source, and the second image information is obtained when the second image sensor performs sensing and sampling of a light emitting signal of the light emitting source.

Mode of the Invention

Reference will now be made in detail to the embodiments of the present disclosure, examples of which are illustrated in the accompanying drawings. Wherever possible, the same reference numbers will be used throughout the drawings to refer to the same or like parts.

Figure 1:
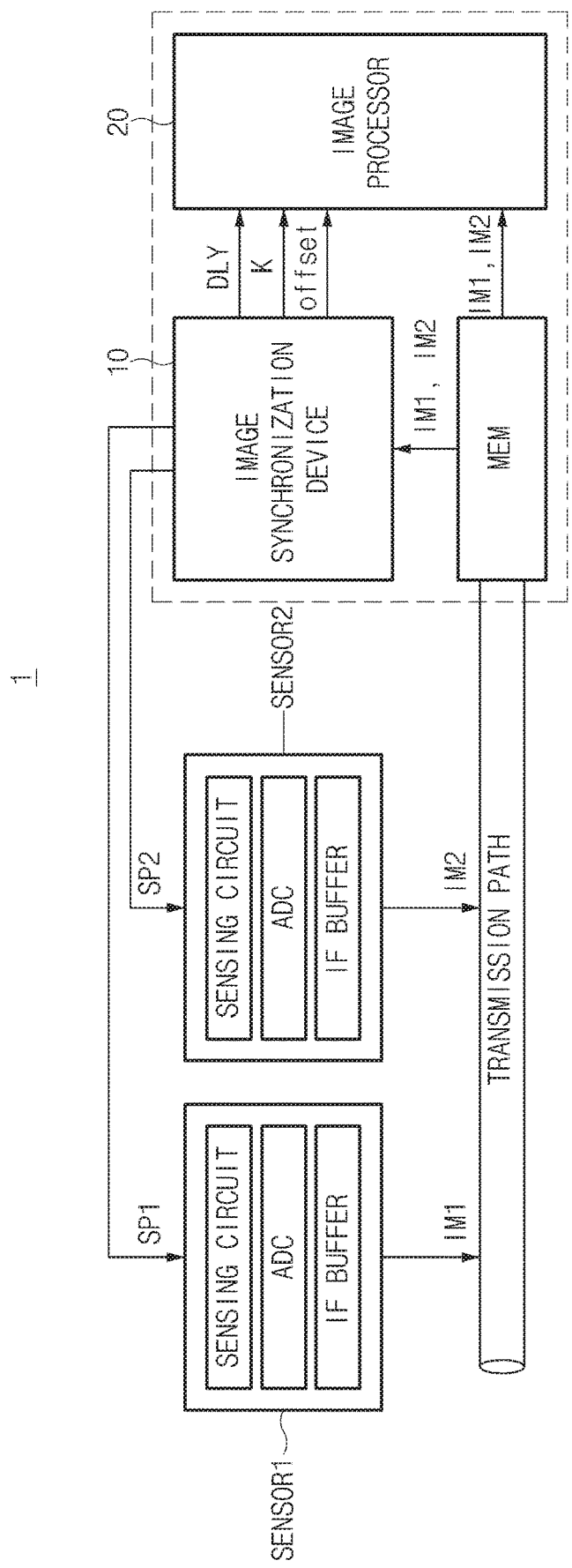
FIG. 1 is a block diagram illustrating a representation of an example of an image information generation apparatus according to an embodiment of the present disclosure.

FIG. 1 is a block diagram illustrating a representation of an example of an image information generation apparatus 1 according to an embodiment of the present disclosure.

Referring to FIG. 1, the image processing device 1 may include a first image sensor (SENSOR1), a second image sensor (SENSOR2), an image information storage circuit (MEM), an image synchronization device 10, and an image processor 20.

The first image (SENSOR1) may generate first image information (IM1), and the second image (SENSOR2) may generate second image information (IM2). Each of the first image sensor (SENSOR1) and the second image sensor (SENSOR2) may be a Charge Coupled Device (CCD) sensor or a Complementary Metal Oxide Semiconductor (CMOS) image sensor. The first image information (IM1) and the second image information (IM2) may be stored in the image information storage circuit (MEM). The first image information (IM1) and the second image information (IM2) may be transmitted to the image information storage circuit (MEM) through a wired transmission path such as a bus or a wireless transmission path.

Each of the first image sensor (SENSOR1) and the second image sensor (SENSOR2) may include a sensing circuit, an Analog-to-Digital Converter (ADC), and an image frame (IF) buffer. Each sensing circuit may include a photodiode. The sensing circuit may convert optical signals into electric signals (e.g., voltages). The electric signals may be denoted by analog electric signals having consecutive values. The ADC may convert the analog electric signals into digital electric signals through sampling. The image frame (IF) buffer may store the digital electric signals therein. In this case, the electric signals may be stored in order of time. For convenience of description, an electric signal for each time may hereinafter be referred to as an image frame. Each of first image information (IM1) and second image information (IM2) may include a plurality of image frames.

The image information storage circuit (MEM) may store the first image information (IM1) received from the first image sensor (SENSOR1) and the second image information (IM2) received from the second image sensor (SENSOR2). The image information storage circuit (MEM) may be a volatile memory or a non-volatile memory. The volatile memory may be any of a static RAM (SRAM), a dynamic RAM (DRAM), a synchronous DRAM (SDRAM), etc. The non-volatile memory may be any of a Read Only Memory (ROM), a Programmable ROM (PROM), an Electrically Erasable and Programmable ROM (EEPROM), an Electrically Erasable and Programmable ROM (EPROM), a flash memory, a phase change RAM (PRAM), a magnetic RAM (MRAM), a resistive RAM (RRAM), a ferroelectric RAM (FRAM), etc.

The image synchronization device 10 may generate delay information (DLY) between the first image information (IM1) and the second image information (IM2) stored in the image information storage circuit (MEM). In accordance with the embodiment, the image synchronization device 10 may calibrate a sampling phase (SP1) of the first image sensor (SENSOR1) and a sampling phase (SP2) of the second image sensor (SENSOR2). In accordance with the embodiment, the image synchronization device 10 may generate a scaling constant (k) and offset information (offset) of the first image information (IM1) and the second image information (IM2).

The image processor 20 may process the first image information (IM1) and the second image information (IM2) on the basis of the delay information (DLY) received from the image synchronization device 10. The image processor 20 may be implemented as one of various data processing devices, for example, a Central Processing Unit (CPU), a Graphics Processing Unit (GPU), a Digital Signal Processor (DSP), an Application Processor (AP), a memory controller, etc.

Operations of the image synchronization device 10 will hereinafter be described with reference to FIGS. 1 to 5.

Figure 2:
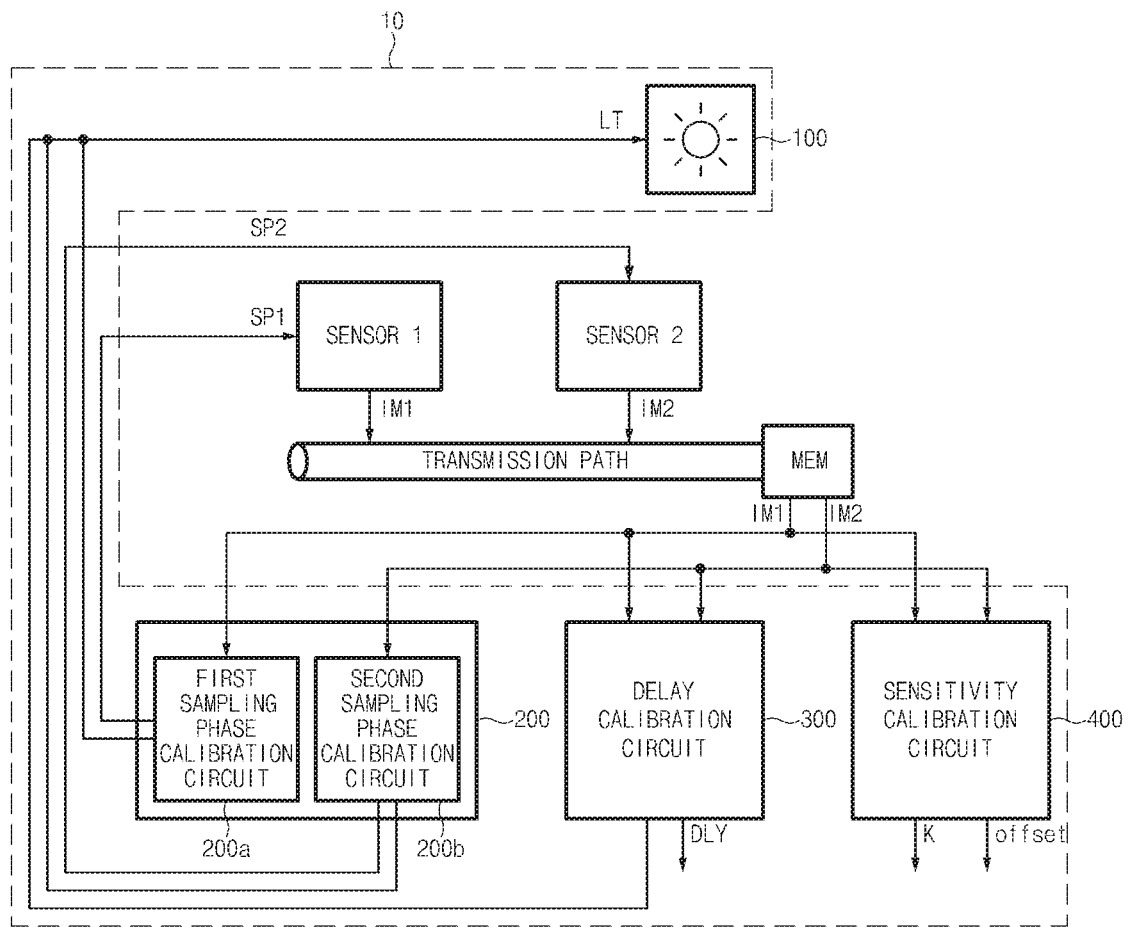
FIG. 2 is a block diagram illustrating a representation of an example of some parts of an image information generation apparatus including constituent elements of the image synchronization device shown in FIG. 1.
Figure 3:
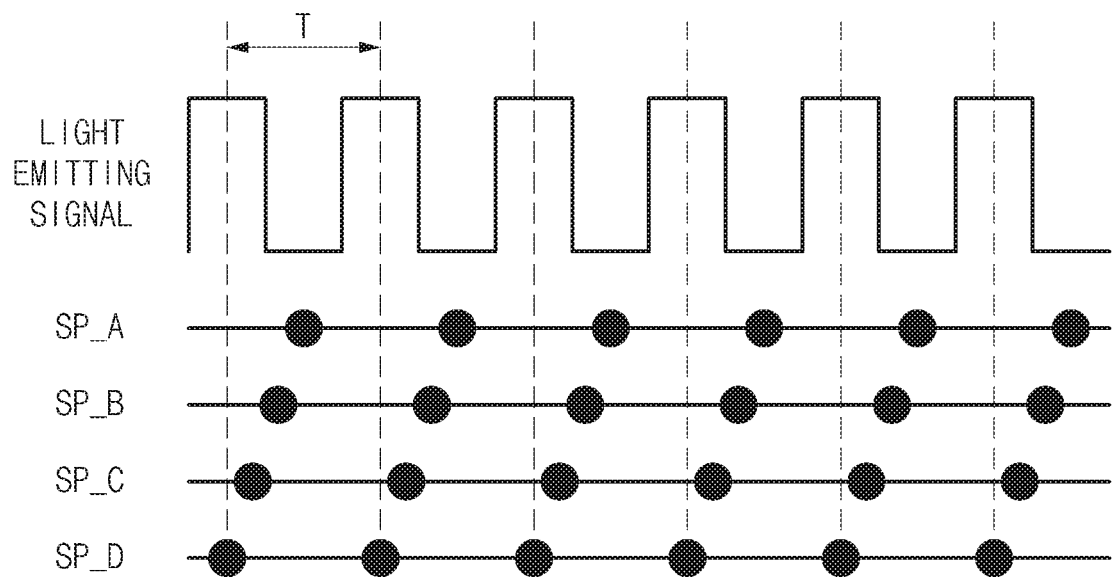
FIG. 3 is a conceptual diagram illustrating a representation of an example of operations of a sampling phase calibration circuit shown in FIG. 2.
Figure 4:
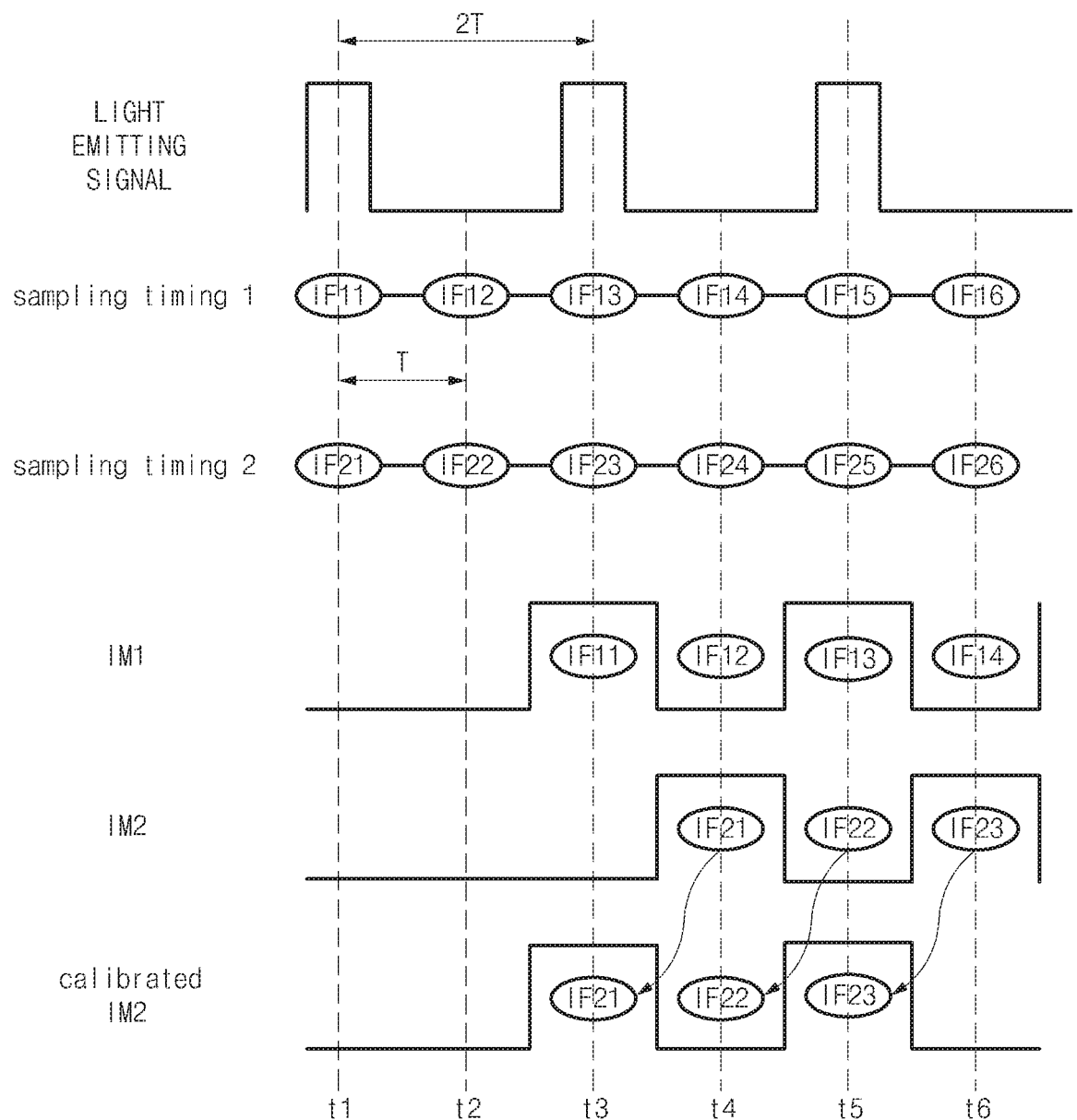
FIG. 4 is a conceptual diagram illustrating a representation of an example of operations of a delay calibration circuit shown in FIG. 2.
Figure 5:
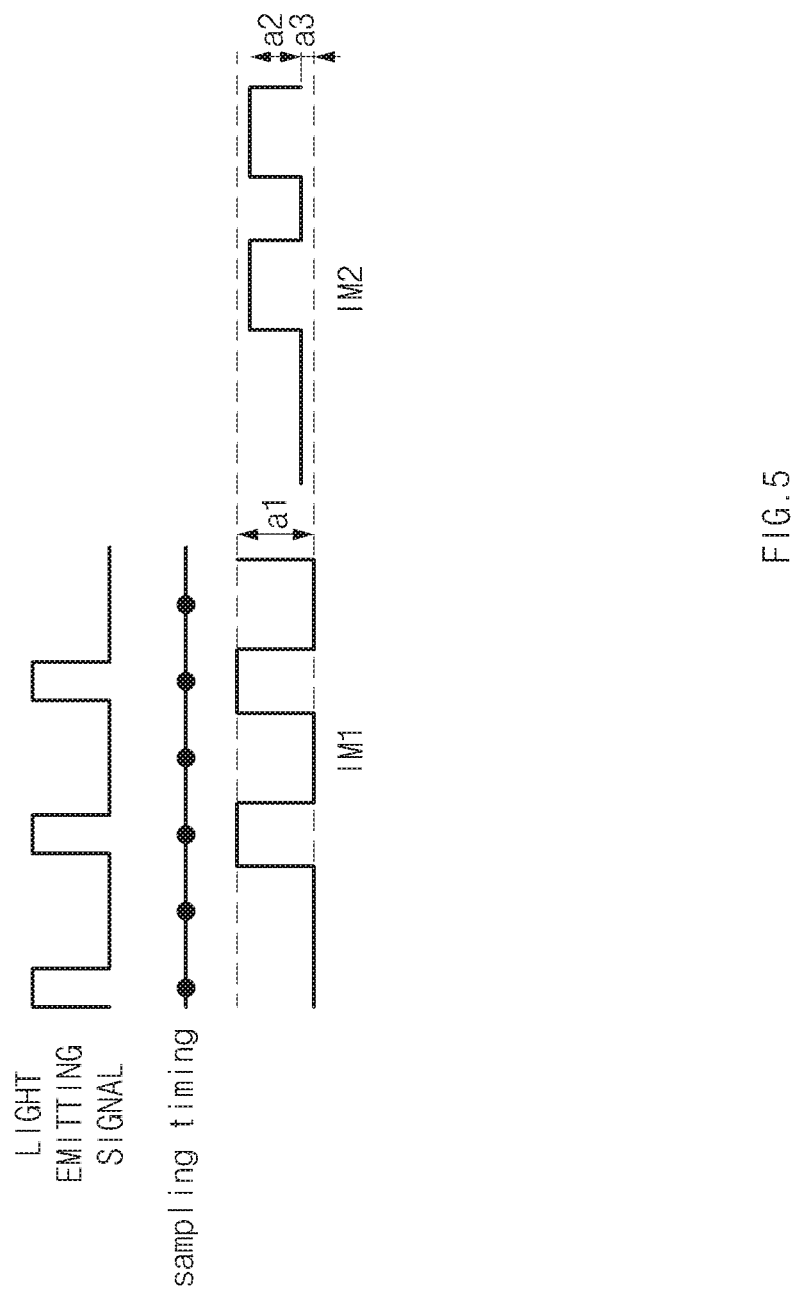
FIG. 5 is a conceptual diagram illustrating a representation of an example of operations of a sensitivity calibration circuit shown in FIG. 2.

FIG. 2 is a block diagram illustrating a representation of an example of some parts of the image information generation apparatus 1 including constituent elements of the image synchronization device 10 shown in FIG. 1. FIG. 3 is a conceptual diagram illustrating a representation of an example of operations of a sampling phase calibration circuit 200. FIG. 4 is a conceptual diagram illustrating a representation of an example of operations of a delay calibration circuit 300. FIG. 5 is a conceptual diagram illustrating a representation of an example of operations of a sensitivity calibration circuit 400.

Referring to FIG. 2, the image synchronization device 10 may include a light emitting source 100, a sampling phase calibration circuit 200, a delay calibration circuit 300, and a sensitivity calibration circuit 400.

The light emitting source 100 may periodically emit light at intervals of a predetermined time. The light emitting source 100 may be a device (e.g., a lamp, a light emitting diode (LED), a laser diode, etc.) for converting electric energy into light energy. However, the scope or spirit of the present disclosure is not limited thereto, and the light emitting source 100 may also be implemented as any one of devices capable of transmitting light energy to the image sensor SENSOR1 or SENSOR2. The light emitting source 100 need not always be implemented as a separate device. For example, natural light may also be used as the light emitting source 100. Referring to FIG. 1, each of the first image sensor (SENSOR1) and the second image sensor (SENSOR2) may perform sensing and sampling of the light emitting signal received from the light emitting source 100, such that the first image sensor (SENSOR1) and the second image sensor (SENSOR2) may respectively generate the first image information (IM1) and the second image information (IM2).

The sampling phase calibration circuit 200 may calibrate the sampling phase SP1 of the first image sensor (SENSOR1) and the sampling phase SP2 of the second image sensor (SENSOR2) on the basis of light emitting timing of the light emitting source 100. The sampling phase calibration circuit 200 may synchronize the sampling phase SP1 of the first image sensor (SENSOR1) and the sampling phase SP2 of the second image sensor (SENSOR2) with the light emitting phase of the light emitting source 100.

Referring to FIG. 3, the light emitting signal from the light emitting source 100 may be emitted at intervals of a predetermined time (T). In FIG. 3, SP_A may denote a case in which the sampling phase SP1 or SP2 of the first image sensor (SENSOR1) or the second image sensor (SENSOR2) is denoted by SP_A, SP_B may denote a case in which the sampling phase SP1 or SP2 of the first image sensor (SENSOR1) or the second image sensor (SENSOR2) is denoted by SP_B, SP_C may denote a case in which the sampling phase SP1 or SP2 of the first image sensor (SENSOR1) or the second image sensor (SENSOR2) is denoted by SP_C, and SP_D may denote a case in which the sampling phase SP1 or SP2 of the first image sensor (SENSOR1) or the second image sensor (SENSOR2) is denoted by SP_D.

Referring to FIG. 3, the sampling phase SP1 of the first image sensor (SENSOR1) and the sampling phase SP2 of the second image sensor (SENSOR2) may have various values in association with the light emitting phase of the light emitting source 100. That is, when each of the sampling phase SP1 of the first image sensor (SENSOR1) and the sampling phase SP2 of the second image sensor (SENSOR2) is denoted by SP_A, SP_B, or SP_C, this means that the sampling phase SP1 or SP2 is different from the light emitting phase of the light emitting source 100. When each of the sampling phase SP1 of the first image sensor (SENSOR1) and the sampling phase SP2 of the second image sensor (SENSOR2) is denoted by SP_D, this means that the sampling phase SP1 or SP2 is identical to the light emitting phase of the light emitting source 100. The sampling phase calibration circuit 200 may set each of the sampling phase SP1 of the first image sensor (SENSOR1) and the sampling phase SP2 of the second image sensor (SENSOR2) to SP_D such that the sampling phases SP1 and SP2 of the first image sensor (SENSOR1) and the second image sensor (SENSOR2) can be synchronized with the light emitting phase of the light emitting source 100. In this case, after any one of the sampling phase SP1 of the first image sensor (SENSOR1) and the sampling phase SP2 of the second image sensor (SENSOR2) is first synchronized with the light emitting phase of the light emitting source 100, the remaining one phase may then be synchronized with the light emitting phase of the light emitting source 100.

Referring back to FIG. 2, the sampling phase calibration circuit 200 may include a first sampling phase calibration circuit 200a and a second sampling phase calibration circuit 200b. The first sampling phase calibration circuit 200a may calibrate the sampling phase SP1 of the first image sensor (SENSOR1). The second sampling phase calibration circuit 200b may calibrate the sampling phase SP2 of the second image sensor (SENSOR2).

The delay calibration circuit 300 may generate delay information (DLY) on the basis of the result of comparison between the first image information (IM1) received from the first image sensor (SENSOR1) and the second image information (IM2) received from the second image sensor (SENSOR2). The first image sensor (SENSOR1) and the second image sensor (SENSOR2) may respectively generate the first image information (IM1) and the second image information (IM2) by sensing and sampling the light emitting signal of the light emitting source 100. However, the first image information (IM1) and the second image information (IM2) may have different delays due to a difference in characteristics between the first image sensor (SENSOR1) and the second image sensor (SENSOR2) or a difference in transmission path between the first image sensor (SENSOR1) and the second image sensor (SENSOR2). The delay calibration circuit 200 may compensate for a difference in delay between the first image sensor (SENSOR1) and the second image sensor (SENSOR2).

Referring to FIG. 4, it is assumed that each of the first image sensor (SENSOR1) and the second image sensor (SENSOR2) has a sampling period (T). In FIG. 4, 'sampling timing 1' may refer to a sampling timing of the first image sensor (SENSOR1), and 'sampling timing 2' may refer to a sampling timing of the second image sensor (SENSOR2). In FIG. 4, a light emitting period (LT) of the light emitting signal may be denoted by 2T. In FIG. 4, the sampling phase SP1 of the first image sensor (SENSOR1) and the sampling phase SP2 of the second image sensor (SENSOR2) may be synchronized with the light emitting phase of the light emitting source 100. The first image information (IM1) including image frames (IF11~IF16) may have a value of "101010", and the second image information (IM2) including image frames (IF21~IF26) may also have the value of "101010" in order of time in the same manner as in the first image information (IM1).

Referring to FIG. 4, the first image information (IM1) (e.g., stored in the image information storage circuit MEM) received by the image synchronization device 10 may be delayed by a predetermined time, for example, 2T, and the second image information (IM2) (e.g., stored in the image information storage circuit MEM) received by the image synchronization device 10 may be delayed by a predetermined time, for example, 3T (=t4−t1). The delay calibration circuit 300 may calculate delay information DLY (T) indicating a difference in delay between the first image information (IM1) and the second image information (IM2). Based on the delay information (T), the image processor 200 may synchronize the image frame (IF11) of the first image information (IM1) and the image frame (IF21) of the second image information (IM2), may synchronize the image frame (IF12) of the first image information (IM1) and the image frame (IF22) of the second image information (IM2), may synchronize the image frame (IF13) of the first image information (IM1) and the image frame (IF23) of the second image information (IM2), and may finally synchronize the image frame (IF14) of the first image information (IM1) and the image frame (IF24) of the second image information (IM2). In accordance with the embodiment, the synchronization operation may be carried out by the delay calibration circuit 300.

The sensitivity calibration circuit 400 may detect a scaling constant (k) for scaling at least one of the first image information (IM1) and the second image information (IM2), or may detect offset information for at least one of the first image information (IM1) and the second image information (IM2), such that the first image information (IM1) and the second image information (IM2) may have the same maximum size.

Referring to FIG. 5, it is assumed that the maximum size of the first image information (IM1) is denoted by 'a1' and the maximum size of the second image information (IM2) is denoted by 'a2'. The sensitivity calibration circuit 400 may calculate the scaling constant (k) as 'a1/a2', and may calculate the offset information (offset) as '−a3'. Accordingly, when the scaling constant (k) is multiplied by each image frame value of the second image information (IM2) and the offset information (offset) is then added to the multiplication result, the added result may be identical to the maximum size of the first image information (IM1).

The sampling phase calibration circuit 200 will hereinafter be described with reference to FIGS. 6, 7, and 3.

Figure 6:
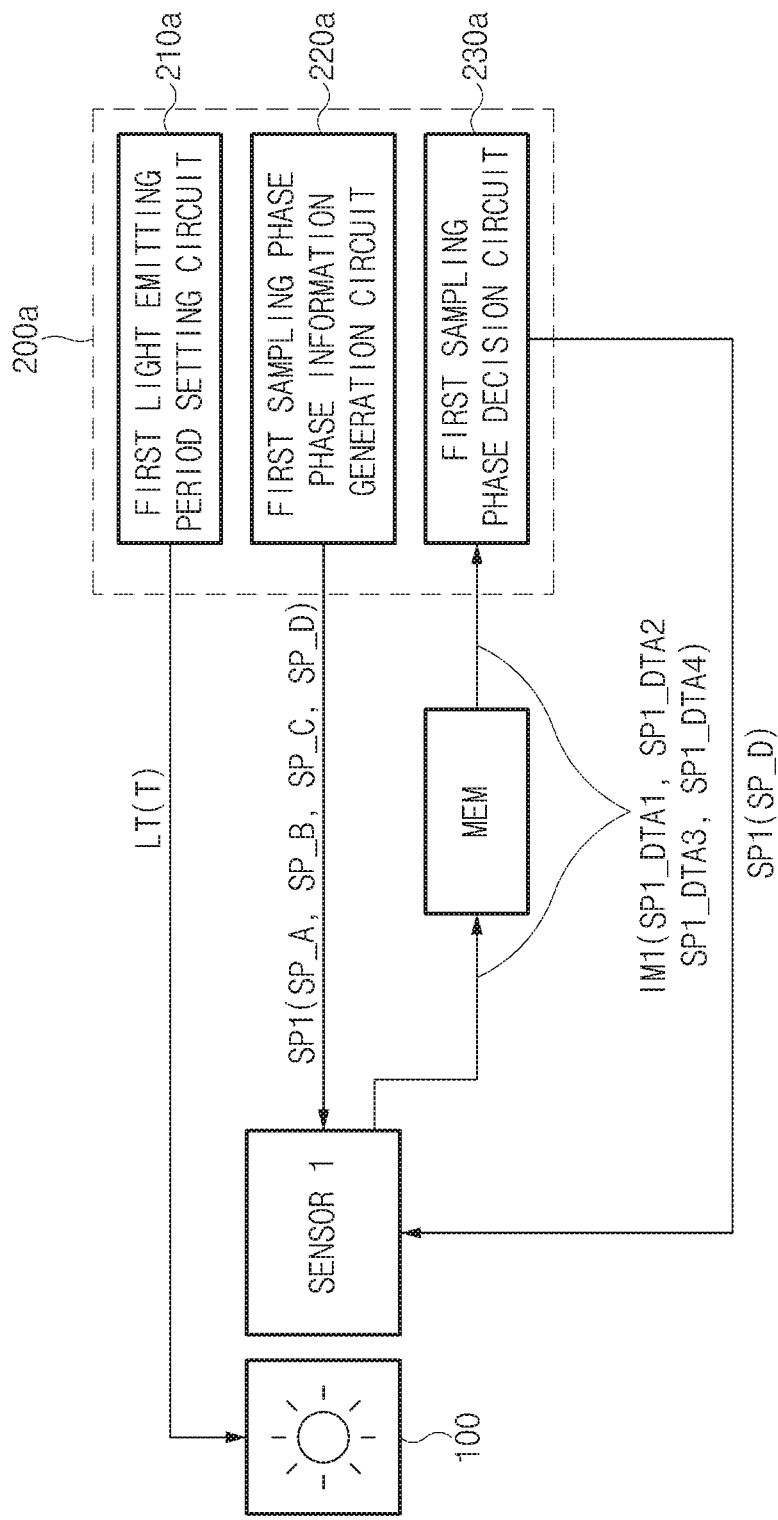
FIG. 6 is a block diagram illustrating a representation of an example of a first sampling phase calibration circuit shown in FIG. 2.

FIG. 6 is a block diagram illustrating the first sampling phase calibration circuit 200a shown in FIG. 2. FIG. 7 is a block diagram illustrating the second sampling phase calibration circuit 200b shown in FIG. 2. For convenience of description and better understanding of the present disclosure, the light emitting source 100, the first image sensor (SENSOR1), the second image sensor (SENSOR2), and the image information storage circuit MEM may also be illustrated in FIGS. 6A and 6B. The first sampling phase calibration circuit 200a and the second sampling phase calibration circuit 200b will hereinafter be described with reference to FIG. 3.

Referring to FIG. 6, the first sampling phase calibration circuit 200a may include a first light emitting period setting circuit 210a, a first sampling phase information generation circuit 220a, and a first sampling phase decision circuit 230a.

The first light emitting period setting circuit 210a may set the light emitting period (LT) of the light emitting source 100 to be identical to the sampling period (T) of the first image sensor (SENSOR1). In accordance with the embodiment, the sampling period (T) of the first image sensor (SENSOR1) may also be identical to the light emitting period (LT) of the light emitting source 100 by the first light emitting period setting circuit 210a.

The first sampling phase information generation circuit 220a may sequentially calibrate the sampling phase SP1 of the first image sensor (SENSOR1) in the order of SP_A→SP_B→SP_C→SP_D in such a manner that the first image sensor (SENSOR1) can perform the sampling operation at different sampling phases. Accordingly, the first image sensor (SENSOR1) may generate sampling phase information SP1_DTA1, SP1_DTA2, SP1_DTA3, or SP1_DTA4 for each sampling phase SP_A, SP_B, SP_C, or SP_D. The sampling phase information SP1_DTA1, SP1_DTA2, SP1_DTA3, or SP1_DTA4 may correspond to the first image information (IM1).

The first sampling phase decision circuit 230a may determine the sampling phase SP1 of the first image sensor (SENSOR1) on the basis of the respective sampling phase information SP1_DTA1, SP1_DTA2, SP1_DTA3, and SP1_DTA4 for the respective sampling phases SP_A, SP_B, SP_C, and SP_D.

For example, as illustrated in FIG. 3, the first sampling phase information generation circuit 220a may first set the sampling phase SP1 of the first image sensor (SENSOR1) to 'SP_A'. In this case, the light emitting timing point deviates from the sampling phase (SP_A) of the first image sensor (SENSOR1), such that the sampling phase information (SP1_DTA1) acquired from each sampling timing may be denoted by "000000".

The first sampling phase decision circuit 230a may determine the sampling phase SP1 of the first image sensor (SENSOR1) on the basis of the sampling phase information (SP1_DTA1) at the sampling phase (SP_A). In accordance with the embodiment, the sampling phase information SP11 is set to "000000", such that the first sampling phase decision circuit 230a may not select 'SP_A' as the sampling phase SP1 of the first image sensor (SENSOR1).

Subsequently, the first sampling phase information generation circuit 220a may change the sampling phase SP1 of the first image sensor (SENSOR1) to 'SP_B'. Even in this case, the light emitting timing deviates from the sampling phase (SP_B) of the first image sensor (SENSOR1), such that the sampling phase information (SP1_DTA2) acquired from each sampling timing may be denoted by "000000".

The first sampling phase decision circuit 230a may determine the sampling phase SP1 of the first image sensor (SENSOR1) on the basis of the sampling phase information (SP1_DTA2) at the sampling phase (SP_B). In accordance with this embodiment, the sampling phase information (SP1_DTA2) is set to "000000", such that the first sampling phase decision circuit 230a may not select 'SP_B' as the sampling phase SP1 of the first image sensor (SENSOR1).

Subsequently, the first sampling phase information generation circuit 220a may change the sampling phase SP1 of the first image sensor (SENSOR1) to 'SP_C'. Even in this case, the light emitting timing deviates from the sampling phase (SP_C) of the first image sensor (SENSOR1), such that the sampling phase information (SP1_DTA3) acquired from each sampling timing may be denoted by "000000".

The first sampling phase decision circuit 230a may determine the sampling phase SP1 of the first image sensor (SENSOR1) on the basis of the sampling phase information (SP1_DTA3) at the sampling phase (SP_C). In accordance with this embodiment, the sampling phase information (SP1_DTA3) is set to "000000", such that the first sampling phase decision circuit 230a may not select 'SP_C' as the sampling phase SP1 of the first image sensor (SENSOR1).

Subsequently, the first sampling phase information generation circuit 220a may change the sampling phase SP1 of the first image sensor (SENSOR1) to 'SP_D'. In this case, the light emitting timing and the sampling phase (SP_D) of the first image sensor (SENSOR1) are in phase with each other, such that the sampling phase information (SP1_DTA4) acquired from each sampling timing may be denoted by "111111".

The first sampling phase decision circuit 230a may determine the sampling phase SP1 of the first image sensor (SENSOR1) on the basis of the sampling phase information (SP1_DTA4) at the sampling phase (SP_D). In accordance with this embodiment, the sampling phase information SP14 is set to "111111", such that the first sampling phase decision circuit 230a may determine 'SP_D' to be the sampling phase SP1 of the first image sensor (SENSOR1).

Figure 7:
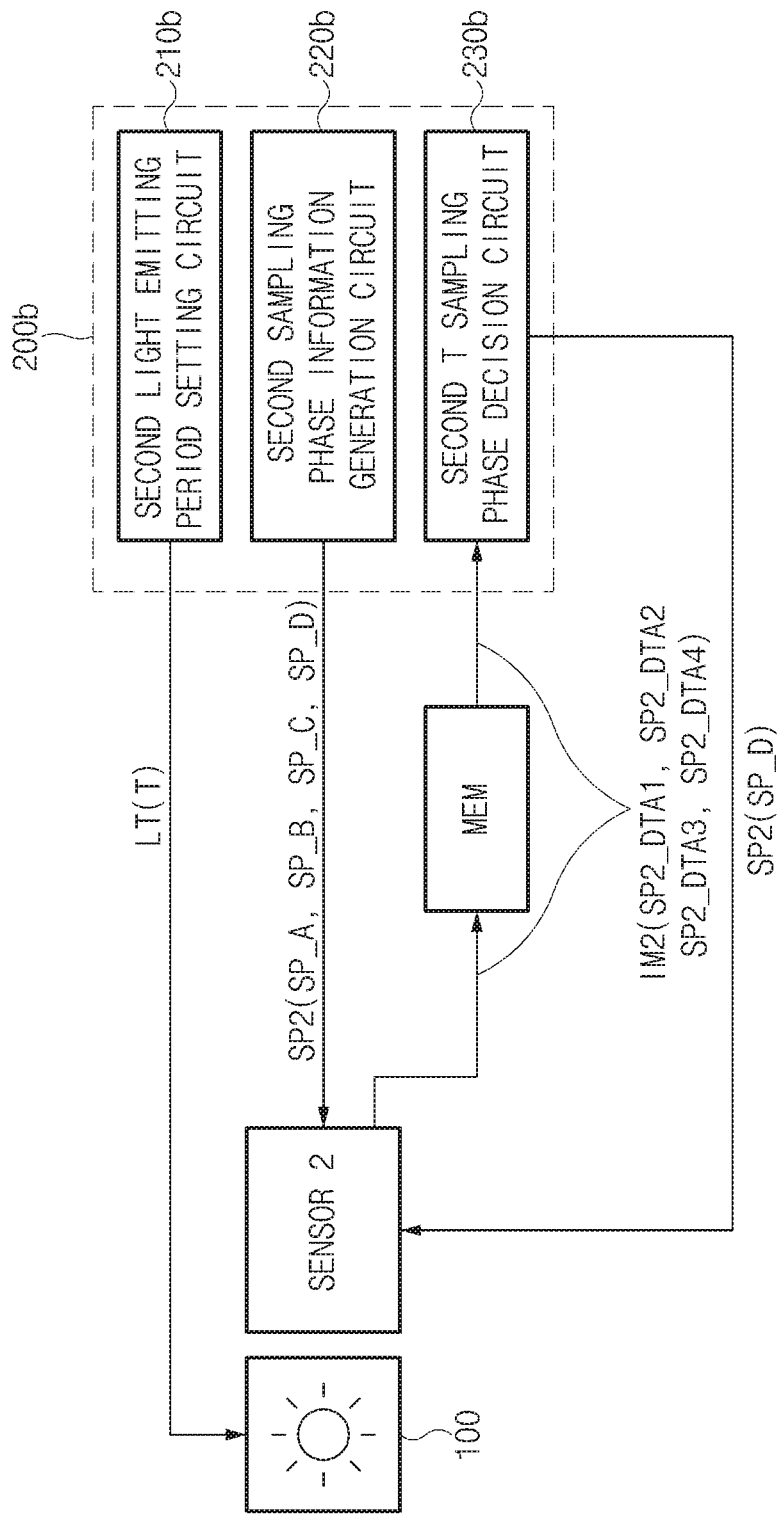
FIG. 7 is a block diagram illustrating a representation of an example of a second sampling phase calibration circuit shown in FIG. 2.

Referring to FIG. 7, the second sampling phase calibration circuit 200b may include a second light emitting period setting circuit 210b, a second sampling phase information generation circuit 220b, and a second sampling phase decision circuit 230c. Whereas the first light emitting period setting circuit 210a, the first sampling phase information generation circuit 220a, and the second sampling phase decision circuit 230a are designed to operate for the first image sensor (SENSOR1), the second light emitting period setting circuit 210b, the second sampling phase information generation circuit 220b, and the second sampling phase decision circuit 230c are designed to operate for the second image sensor (SENSOR2), and the remaining operations other than the use of the second image sensor (SENSOR2) are identical to those of FIG. 6, and as such a detailed description thereof will herein be omitted for convenience of description. In FIG. 7, the sampling phase information SP2_DTA1, SP2_DTA2, SP2_DTA3, and SP2_DTA4 may correspond to the second image information (IM2). In accordance with the embodiment, the second light emitting period setting circuit 210b may allow the sampling period (T) of the second image sensor (SENSOR2) to be identical to the light emitting period (LT).

The first sampling phase calibration circuit 200a may allow the sampling phase SP1 of the first image sensor (SENSOR1) to be in phase with the light emitting timing of the light emitting source 100. The second sampling phase calibration circuit 200b may allow the sampling phase SP2 of the second image sensor (SENSOR2) to be in phase with the light emitting timing of the light emitting source 100. Therefore, the sampling phase calibration circuit 200 may allow the sampling phase SP1 of the first image sensor (SENSOR1) to be in phase with the sampling phase (SP2) of the second image sensor (SENSOR2).

Figure 8:
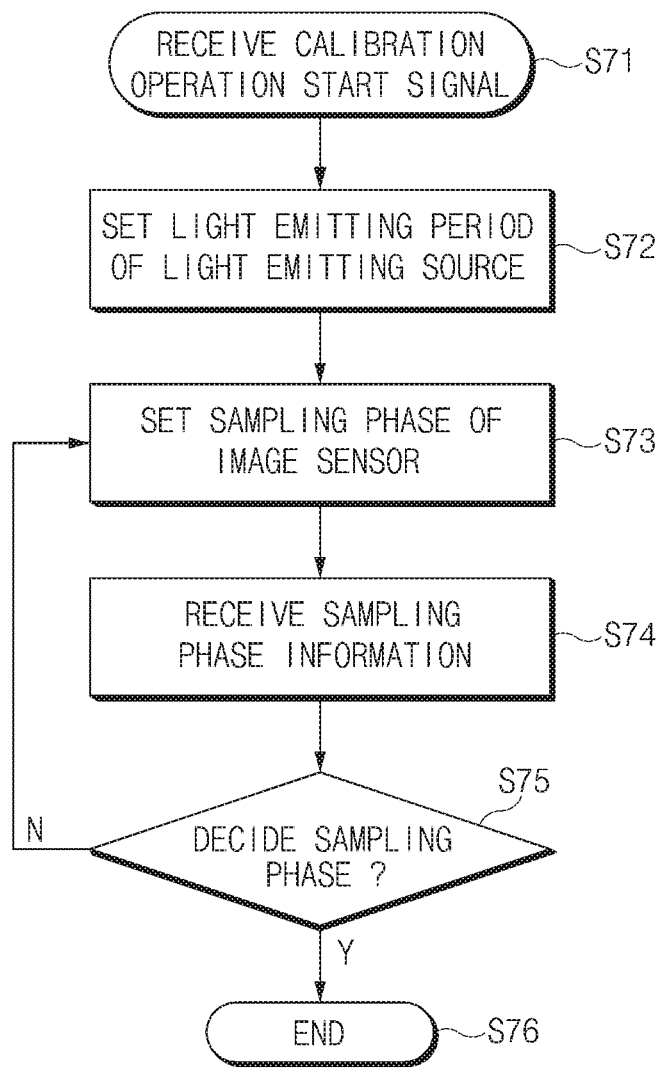
FIG. 8 is a flowchart illustrating a representation of an example of operations of the sampling phase calibration circuit.

FIG. 8 is a flowchart illustrating a representation of an example of operations of the sampling phase calibration circuit 200.

Referring to FIG. 8, the sampling phase calibration circuit 200 may receive a sampling phase calibration operation start signal in step S71. The sampling phase calibration operation start signal may be received from an external device (such as the image processor 20 of FIG. 1) of the image synchronization device 10, may be generated at intervals of a predetermined time, or may be generated whenever the image information generation apparatus 1 is powered on.

In step S72, the first light emitting period setting circuit 210a may set the light emitting period (LT) of the light emitting source 100 to be identical to the sampling period (T) of the first image sensor (SENSOR1), and the second light emitting period setting circuit 210b may set the light emitting period (LT) of the light emitting source 100 to be identical to the sampling period (T) of the second image sensor (SENSOR2).

In step S73, the first sampling phase information generation circuit 220a may set the sampling phase SP1 of the first image sensor (SENSOR1) to 'SP_A', and the second sampling phase information generation circuit 220b may set the sampling phase SP2 of the second image sensor (SENSOR2) to 'SP_A'.

Each of the first image sensor (SENSOR1) and the second image sensor (SENSOR2) may perform sensing and sampling of the light emitting signal at the sampling phase (SP_A) during the sampling period (T), such that the first image sensor (SENSOR1) may generate the sampling phase information SP1_DTA1 and the second image sensor (SENSOR2) may generate the sampling phase information SP2_DTA2, and thus the sampling phase information SP1_DTA1 and SP2_DTA2 may be transmitted to the image information storage circuit (MEM).

In step S74, the first sampling phase decision circuit 230a may receive the sampling phase information SP1_DTA1 stored in the image information storage circuit (MEM), and the second sampling phase decision circuit 230b may receive the sampling phase information SP2_DTA2 stored in the image information storage circuit (MEM).

The first sampling phase decision circuit 230a may determine whether the sampling phase SP1 of the first image sensor (SENSOR1) is to be set to 'SP_A' on the basis of the first sampling phase information SP1_DTA1, and the second sampling phase decision circuit 230b may determine whether the sampling phase SP2 of the second image sensor (SENSOR2) is to be set to 'SP_A' on the basis of the sampling phase information SP2_DTA1. In accordance with this embodiment, each of the sampling phase information SP1_DTA1 and the other sampling phase information SP2_DTA1 is denoted by "000000", such that 'SP_A' is not selected ('N' in S75).

The above steps S73~S75 may be repeated at each of the sampling phases SP_B, SP_C, and SP_D. In the sampling phase (SP_D), the first sampling phase decision circuit 230a may determine whether the sampling phase SP1 of the first image sensor (SENSOR1) is to be set to 'SP_D' on the basis of the sampling phase information SP1_DTA4, and the second sampling phase decision circuit 230b may determine whether the sampling phase SP2 of the second image sensor (SENSOR2) is to be set to 'SP_D' on the basis of the sampling phase information SP2_DTA4. In accordance with this embodiment, each of the sampling information SP1_DTA4 and the other sampling information SP2_DTA4 is denoted by "111111", such that the first sampling phase decision circuit 230a may determine the sampling phase SP1 of the first image sensor (SENSOR1) to be 'SP_D' and the second sampling phase decision circuit 230b may determine the sampling phase SP2 of the second image sensor (SENSOR2) to be 'SP_D' ('Y' in S75).

If the sampling phases SP1 and SP2 of the image sensors SENSOR1 and SENSOR2 are decided, the sampling phase calibration circuit 200 may stop operation in step S76.

Although the first sampling phase calibration circuit 200a and the second sampling phase calibration circuit 200b simultaneously operate as illustrated in FIG. 8 for convenience of description, the second sampling phase calibration circuit 200b may start operation after the first sampling phase calibration circuit 200a stops operation as necessary.

Figure 9:
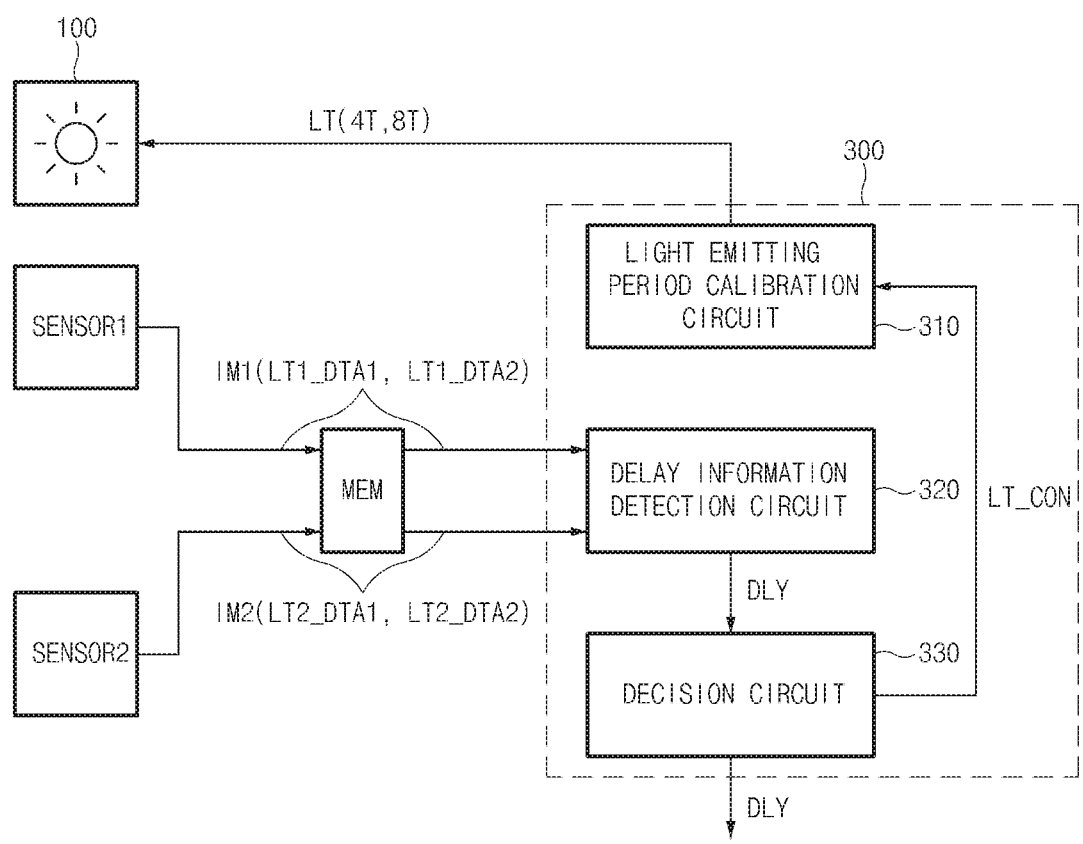
FIG. 9 is a block diagram illustrating a representation of an example of the delay calibration circuit shown in FIG. 2.

FIG. 9 is a block diagram illustrating a representation of an example of the delay calibration circuit 300 shown in FIG. 2. For convenience of description, the light emitting source 100, the first image sensor (SENSOR1), the second image sensor (SENSOR2), and the image information storage circuit (MEM) are further shown in FIG. 9.

Referring to FIG. 9, the delay calibration circuit 300 may include a light emitting period calibration circuit 310, a delay information detection circuit 320, and a decision circuit 330.

The light emitting period calibration circuit 310 may calibrate the light emitting period (LT) of the light emitting source 100. It is assumed that the sampling period of the first image sensor (SENSOR1) and the sampling period of the second image sensor (SENSOR2) are set to the same value (T) for convenience of description. The light emitting period (LT) of the light emitting source 100 may be set to $2^N$ times (N being a natural number) the sampling period (T) of each image sensor SENSOR1 or SENSOR2. In accordance with the embodiment, the light emitting period calibration circuit 310 may calibrate the light emitting period (LT) of the light emitting source 100 to be 4T.

In accordance with the embodiment, the light emitting period calibration circuit 310 may also calibrate the sampling period of the first image sensor (SENSOR1) and the sampling period of the second image sensor (SENSOR2), instead of the light emitting period (LT) of the light emitting source 100. For example, the light emitting period calibration circuit 310 may calibrate the sampling period of each image sensor SENSOR1 or SENSOR2 to be $½^N$ times the light emitting period (LT) of the light emitting source 100.

The first image sensor (SENSOR1) may generate first light emitting period information (LT1_DTA1) for the set light emitting period (LT). In addition, the second image sensor (SENSOR2) may generate second light emitting period information (LT2_DTA1) for the set light emitting period (LT). The first light emitting period information (LT1_DTA1) and the second light emitting period information (LT2_DTA1) may be received by the delay information detection circuit 320 after passing through the image information storage circuit (MEM). The first light emitting period information (LT1_DTA1) may correspond to the first image information (IM1), and the second light emitting period information (LT2_DTA1) may correspond to the second image information (IM2).

The delay information detection circuit 320 may detect delay information (DLY) on the basis of the result of comparison between the first light emitting period information (LT1_DTA1) and the second light emitting period information (LT2_DTA1). In accordance with the embodiment, the delay information detection circuit 320 may synchronize the first light emitting period information (LT1_DTA1) and the second light emitting period information (LT2_DTA1) on the basis of the delay information (DLY). That is, the delay information detection circuit 320 may reflect the delay information (DLY) in the first light emitting period information (LT1_DTA1) and the second light emitting period information (LT2_DTA1).

After the delay information detection circuit 320 detects the delay information (DLY), the decision circuit 330 may determine whether or not the delay calibration circuit 300 will continue to perform the delay calibration operation. The decision circuit 330 may activate a light emitting period calibration signal (LT_CON) when the delay information (DLY) is equal to or less than a predetermined value.

The light emitting period calibration circuit 310 may calibrate the light emitting period (LT) of the light emitting source 100 on the basis of the light emitting period calibration signal (LT_CON). The light emitting period calibration circuit 310 may allow the light emitting period (LT) of the light emitting source 100 to be double that of a previous light emitting period. In accordance with the present disclosure, the light emitting period calibration circuit 310 may calibrate the light emitting period (LT) of the light emitting source 100 to be 8T.

The first image sensor (SENSOR1) may generate first light emitting period information (LT1_DTA2) for the set light emitting period (LT). In addition, the second image sensor (SENSOR2) may generate second light emitting period information (LT2_DTA2) for the set light emitting period (LT). The first light emitting period information (LT1_DTA2) and the second light emitting period information (LT2_DTA2) may be received by the delay information detection circuit 320 after passing through the image information storage circuit (MEM). The first light emitting period information (LT1_DTA2) may correspond to the first image information (IM1), and the second light emitting period information (LT2_DTA2) may correspond to the second image information (IM2).

The delay information detection circuit 320 may detect temporary delay information on the basis of the result of comparison between the first light emitting period information (LT1_DTA2) and the second light emitting period information (LT2_DTA2). The delay information detection circuit 320 may update the sum of the previous delay information (DLY) and the temporary delay information as new delay information (DLY).

The decision circuit 330 may determine whether or not the delay calibration circuit 300 will continue to perform the delay calibration operation on the basis of the updated delay information (DLY). In accordance with the embodiment, the decision circuit 330 may stop the delay calibration operation by deactivating the light emitting period calibration signal (LT_CON). Finally, the decision circuit 300 may output the last delay information (DLY) to an external part (e.g., the image processor 20).

Figure 10:
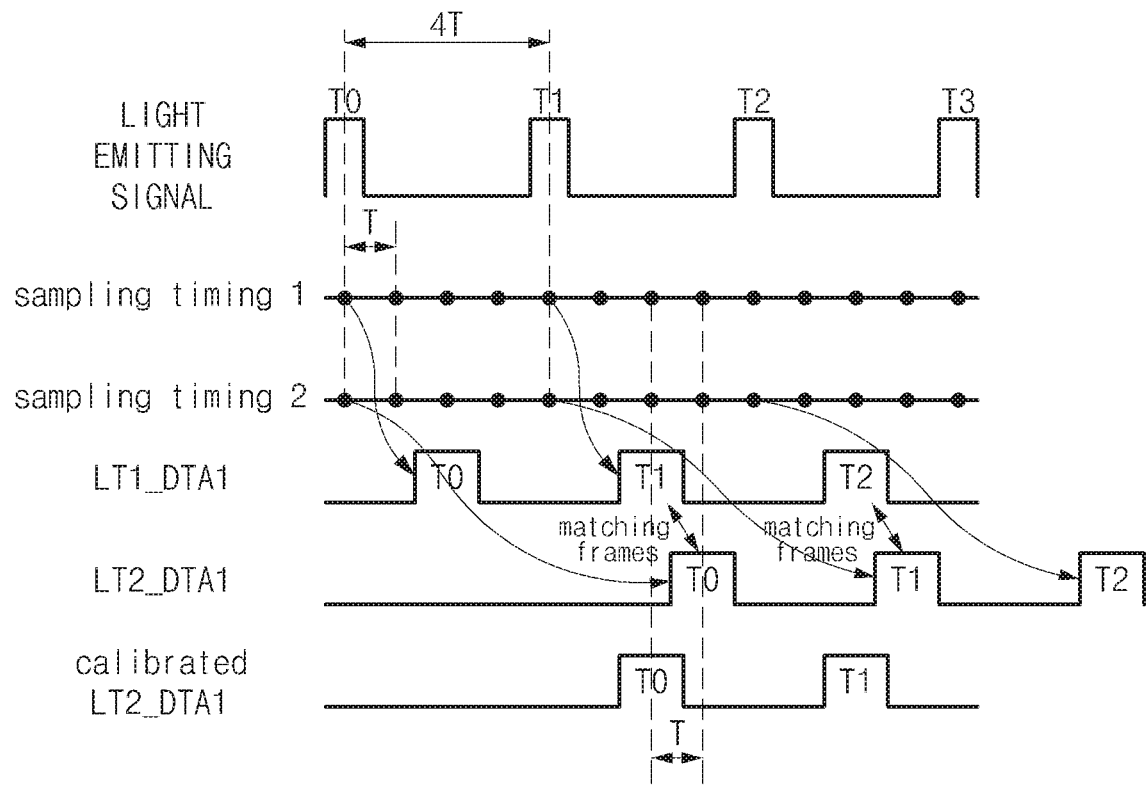
FIGS. 10 and 11 are conceptual diagrams illustrating a representation of an example of operations of the delay calibration circuit.
Figure 11:
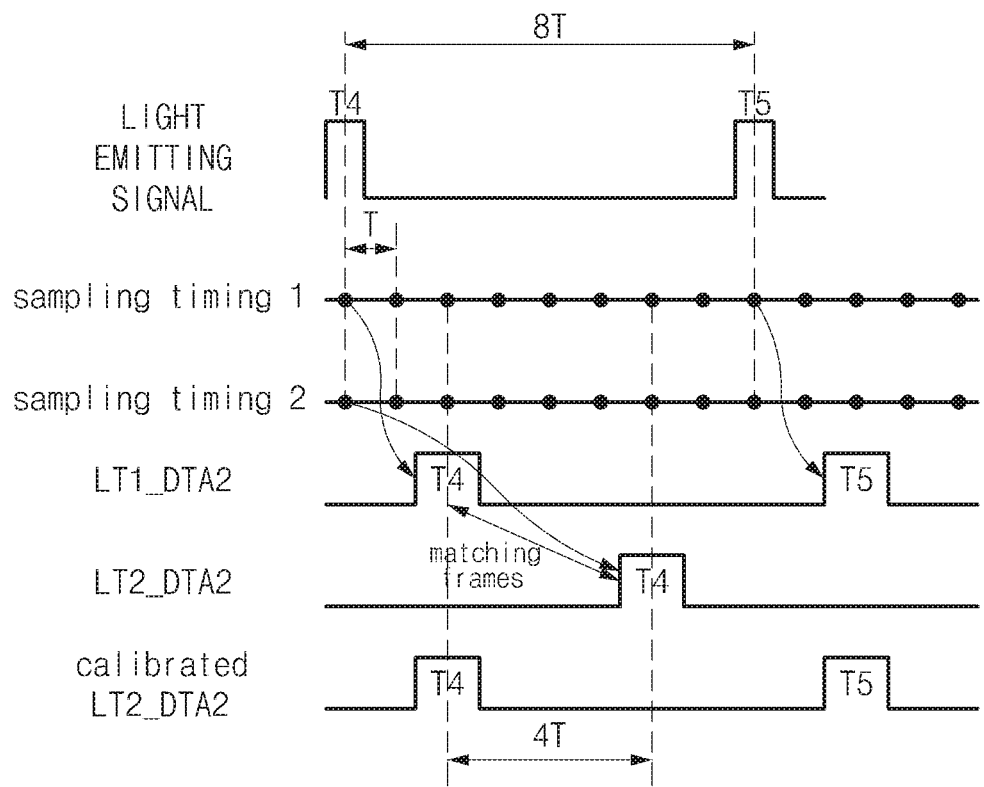

FIGS. 10 and 11 are conceptual diagrams illustrating a representation of an example of operations of the delay calibration circuit 300. FIG. 10 illustrates an exemplary case in which the light emitting period (LT) of the light emitting source 100 is set to four times the sampling period (T) of each of the first and second image sensors SENSOR1 and SENSOR2. FIG. 11 illustrates an exemplary case in which the light emitting period (LT) of the light emitting source 100 is set to eight times the sampling period (T) of each of the first and second image sensors SENSOR1 and SENSOR2. However, the scope or spirit of the present disclosure is not limited thereto, and the sampling period is only exemplary for convenience of description.

Referring to FIG. 10, the light emitting period calibration circuit 310 may allow the light emitting period (LT) of the light emitting source 100 to be set to four times the sampling period (T) of each of the first image sensor (SENSOR1) and the second image sensor (SENSOR2). Therefore, the first image sensor (SENSOR1) and the second image sensor (SENSOR2) may perform four sampling operations at intervals of a light emitting period (LT) of 4T. In accordance with the embodiment, it is assumed that the sampling phase of the first image sensor (SENSOR1) and the sampling phase of the second image sensor (SENSOR2) are in phase with each other.

If the sampling period (T) of the first image sensor (SENSOR1) is identical to the light emitting period (LT), the first image sensor (SENSOR1) may generate a high-level image frame. If the sampling period (T) of the first image sensor (SENSOR1) is not identical to the light emitting period (LT), the first image sensor (SENSOR1) may generate a low-level image frame. As a result, the first image sensor (SENSOR1) may generate "1000100010001" as light emitting period information (LT1_DTA1) for the light emitting period (4T). In accordance with the embodiment, the light emitting period information (LT1_DTA1) may be stored in the image information storage circuit (MEM) after being delayed by 2T.

In the same manner as in the first image sensor (SENSOR1), the second image sensor (SENSOR2) may generate "1000100010001" as the light emitting period information (LT2_DTA1) for the light emitting period (4T). In accordance with the present disclosure, the light emitting period information (LT2_DTA1) may be stored in the image information storage circuit (MEM) after being delayed by 7T.

The delay information detection circuit 320 may detect delay information (DLY) on the basis of the result of comparison between the first light emitting period information (LT1_DTA1) and the second light emitting period information (LT2_DTA1). The delay information detection circuit 320 may detect delay information of T.

Although the second light emitting period information (LT2_DTA1) of FIG. 10 is calibrated by delay information of T, the calibrated second light emitting period information (calibrated LT2_DTA1) and the first light emitting period information (LT1_DTA1) are 4T out of phase with each other. Therefore, the delay calibration circuit 300 may calculate delay information by changing the light emitting period (LT).

Referring to FIG. 11, the light emitting period calibration circuit 310 may allow the light emitting period (LT) of the light emitting source 100 to be set to eight times the sampling period (T) of each of the first image sensor (SENSOR1) and the second image sensor (SENSOR2). That is, the light emitting period calibration circuit 310 may allow the light emitting period (8T) of the light emitting source 100 to be set to double the previous light emitting period (4T).

Therefore, the first image sensor (SENSOR1) and the second image sensor (SENSOR2) may perform eight sampling operations at intervals of the light emitting period (LT) of 8T. In FIG. 11, the sampling phase of the first image sensor (SENSOR1) and the sampling phase of the second image sensor (SENSOR2) are in phase with each other.

If the sampling period (T) of the first image sensor (SENSOR1) is identical to the light emitting period (LT), the first image sensor (SENSOR1) may generate a high-level image frame. If the sampling period (T) of the first image sensor (SENSOR1) is not identical to the light emitting period (LT), the first image sensor (SENSOR1) may generate a low-level image frame. As a result, the first image sensor (SENSOR1) may generate "100000001" as light emitting period information (LT1_DTA2) for the light emitting period (8T). In accordance with the embodiment, the light emitting period information (LT1_DTA2) may be stored in the image information storage circuit (MEM) after being delayed by 2T.

In the same manner as in the first image sensor (SENSOR1), the second image sensor (SENSOR2) may generate "100000001" as the light emitting period information (LT2_DTA2) for the light emitting period (8T). In accordance with the present disclosure, the light emitting period information (LT2_DTA2) may be stored in the image information storage circuit (MEM) after being delayed by 6T. In this case, the previous delay information (DLY) of T is reflected in the light emitting period information (LT2_DTA2).

The delay information detection circuit 320 may detect temporary delay information on the basis of the result of comparison between the first light emitting period information (LT1_DTA2) and the second light emitting period information (LT2_DTA2). The delay information detection circuit 320 may detect temporary delay information of 4T.

The delay information detection circuit 320 may add the delay information (DLY) of T detected when the light emitting period (LT) is 4T to the temporary delay information of 4T detected when the light emitting period (LT) is 8T, such that the delay information detection circuit 320 may detect the last delay information (DLY) of 5T. That is, the delay information detection circuit 320 may update the delay information (DLY) to the sum of the previous delay information (DLY) of T and the temporary delay information of 4T.

Figure 12:
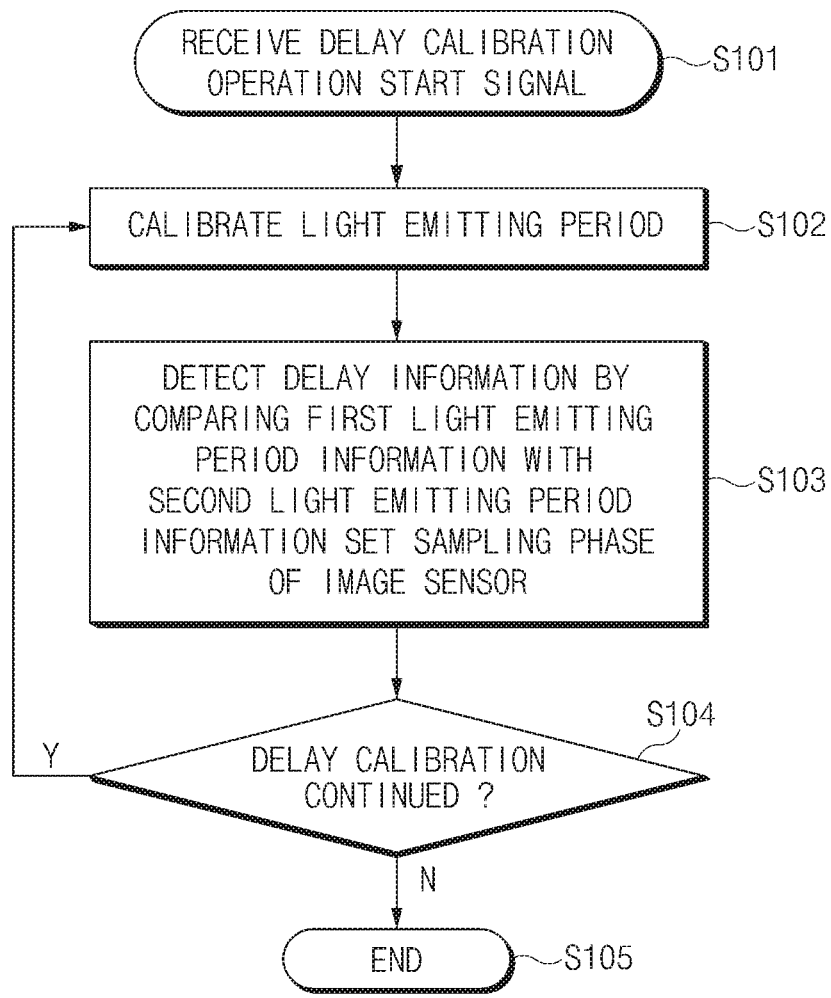
FIG. 12 is a flowchart illustrating a representation of an example of operations of the delay calibration circuit.

FIG. 12 is a flowchart illustrating a representation of an example of operations of the delay calibration circuit 300.

Referring to FIG. 12, the delay calibration circuit 300 may receive a delay calibration operation start signal in step S101. The delay calibration operation start signal may be transmitted from the sampling phase calibration circuit 200 after completion of the sampling phase calibration operation of the sampling phase calibration circuit 200. Alternatively, differently from the operation of the sampling phase calibration circuit 200, the delay calibration operation start signal may be activated at intervals of a predetermined time or may be activated whenever the image information generation apparatus 1 is powered on.

The light emitting period calibration circuit 310 may calibrate the light emitting period (LT) of the light emitting source 100 in step S102. The sampling period of the first image sensor (SENSOR1) and the sampling period of the second image sensor (SENSOR2) may be set to the same value (T). Here, the light emitting period (LT) may be set to $2^N$ times (N being a natural number) the sampling period (T). In the embodiment of FIG. 10, the light emitting period (LT) may be set to four times the sampling period (T).

The delay information detection circuit 320 may compare the first light emitting period information (LT1_DTA1) received from the first image sensor (SENSOR1) with the second light emitting period information (LT2_DTA1) received from the second image sensor (SENSOR2), may detect delay information (DLY) for the set light emitting period (LT), and may calibrate delays of the first light emitting period information (LT1_DTA1) and the second light emitting period information (LT2_DTA1) in step S103. In the embodiment of FIG. 10, delay information (DLY) for the light emitting period 4T is detected and the delay of the second light emitting period information (LT2_DTA1) may be calibrated such that the calibrated delay of the second light emitting period information (LT2_DTA1) is matched to that of the first light emitting period information (LT1_DTA1) such that the calibrated delay of the second light emitting period information (calibrated LT2_DTA1) has the same value as in the first light emitting period information (LT1_DTA1).

The decision circuit 330 may determine whether or not the delay calibration operation will be continued in step S104. If the detected delay information (DLY) is equal to or less than a predetermined value (Y in S104), the decision circuit 330 may continuously perform the delay calibration operation. If the detected delay information (DLY) is higher than the predetermined value (N in S104), the decision circuit 330 may stop the delay calibration operation in step S105. The predetermined value may be a transmission delay that has been generated from the first image sensor (SENSOR1) or the second image sensor (SENSOR2) to the image information storage circuit (MEM). In accordance with the embodiment, the decision circuit 330 may predetermine how many times the delay calibration operation will be performed, and may repeatedly perform the delay calibration operation the predetermined number of times only. In accordance with the embodiment, if the detected delay information (DLY) is zero '0', the decision circuit 330 may stop the delay calibration operation. In the embodiment of FIG. 10, it is assumed that the delay information (DLY) is equal to or less than the predetermined value or is less than the predetermined number of times.

In the embodiment of FIG. 11, The light emitting period calibration circuit 310 may set the light emitting period (LT) of the light emitting source 100 to be different from the previous light emitting period in step S102. In the embodiment of FIG. 11, the light emitting period (LT) may be set to 8T corresponding to twice the previous light emitting period (4T).

The delay information detection circuit 320 may compare the first light emitting period information (LT1_DTA2) received from the first image sensor (SENSOR1) with the second light emitting period information (LT2_DTA2) received from the second image sensor (SENSOR2), may detect delay information (DLY) for the set light emitting period (LT), and may calibrate delays of the first and second light emitting period information LT1_DTA2 and LT2_DTA2 in step S103. In the embodiment of FIG. 11, delay information (4T) for the light emitting period (8T) may be detected. The delay information detection circuit 320 may detect the sum (5T) of the delay information (T) of the previous light emitting period (4T) and the delay information (4T) of the latest light emitting period (8T) as delay information (DLY).

The decision circuit 330 may determine whether the delay calibration operation will be continued in step S104. In the embodiment of FIG. 11, it is assumed that the delay information (5T) is longer than a transmission delay that has been generated from the first or second image sensor SENSOR1 or SENSOR2 to the image information storage circuit (MEM).

Accordingly, the delay calibration operation may be stopped in step S105. The delay information (DLY) may be output to the image processor 20.

Although the above-mentioned embodiment has disclosed that the delay calibration circuit 300 fixes the sampling period (T) of the first and second image sensors SENSOR1 and SENSOR2 and calibrates the light emitting period (LT) of the light emitting source 100 so as to perform the delay calibration operation for convenience of description, the scope or spirit of the present disclosure is not limited thereto, and it should be noted that the delay calibration circuit 300 may also perform the delay calibration operation by fixing the light emitting period (LT) of the light emitting source 100 and calibrating the sampling period (T) of the first image sensor (SENSOR1) and the second image sensor (SENSOR2). In this case, the light emitting period calibration circuit 310 may calibrate the sampling period of the first image sensor (SENSOR1) and the sampling period of the second image sensor (SENSOR2). For example, each of the sampling period of the first images sensor (SENSOR1) and the sampling period of the second image sensor (SENSOR2) may be set to $1/2^N$ times the light emitting period (LT) of the light emitting source 100.

Figure 13:
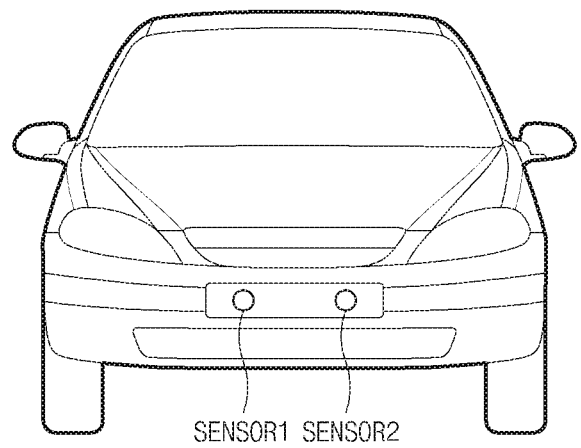
FIG. 13 is a view illustrating a representation of an example to which the image information generation apparatus of the embodiment is applied.

FIG. 13 is a view illustrating a representation of an example to which the image information generation apparatus 1 of the embodiment is applied.

The image information generation apparatus 1 may be used in various technical fields. For example, the image information generation apparatus 1 may recognize a driving lane of a vehicle to perform lane keeping, or may prevent vehicle collision by recognizing a peripheral person or object. The first image sensor (SENSOR1) and the second image sensor (SENSOR2) of the image information generation apparatus 1 may construct a stereo camera.

Referring to FIG. 13, the first image sensor (SENSOR1) and the second image sensor (SENSOR2) may be located at the front of the vehicle. The first image sensor (SENSOR1) and the second image sensor (SENSOR2) may have different delays needed when image information is stored in the image information storage circuit (MEM) due to a difference in installation position between the first image sensor (SENSOR1) and the second image sensor (SENSOR2) or device characteristics. The image synchronization device 10 according to the embodiment of the present disclosure may detect delay information and may provide the detected delay information to the image processor 20, such that the image processor 20 may synchronize image information received from the first image sensor (SENSOR1) and image information received from the second image sensor (SENSOR2). Therefore, the image processor 20 may acquire image information generated at the same time through the first image sensor (SENSOR1) and the second image sensor (SENSOR2), such that the position of objects present in a peripheral region can be correctly estimated, and autonomous driving of the vehicle can be performed based on the position estimation result.

Those skilled in the art will appreciate that the invention may be carried out in other specific ways than those set forth herein without departing from the spirit and essential characteristics of the invention. The above embodiments are therefore to be construed in all aspects as illustrative and not restrictive. The scope of the invention should be determined by the appended claims and their legal equivalents, not by the above description. Further, all changes coming within the meaning and equivalency range of the appended claims are intended to be embraced therein. In addition, it is obvious to those skilled in the art that claims that are not explicitly cited in each other in the appended claims may be presented in combination as an embodiment of the invention or included as a new claim by a subsequent amendment after the application is filed.

Although a number of illustrative embodiments consistent with the invention have been described, it should be understood that numerous other modifications and embodiments can be devised by those skilled in the art that will fall within the spirit and scope of the principles of this disclosure. Particularly, numerous variations and modifications are possible in the component parts and/or arrangements which are within the scope of the disclosure, the drawings and the accompanying claims. In addition to variations and modifications in the component parts and/or arrangements, alternative uses will also be apparent to those skilled in the art.

INDUSTRIAL APPLICABILITY

The embodiments of the present disclosure may synchronize image information transmitted from a plurality of image sensors.

The invention claimed is:
1. An image synchronization device comprising:
a light emitting source configured to emit light at intervals of a predetermined time;
a sampling phase calibration circuit configured to calibrate a sampling phase of each of the first image sensor and the second image sensor on the basis of a light emitting timing of the light emitting source; and
a delay calibration circuit configured to generate delay information on the basis of a result of comparison between first image information transmitted from the first image sensor and second image information transmitted from the second image sensor, wherein the first image information is obtained when the first image sensor performs sensing and sampling of a light emitting signal of the light emitting source, and the second image information is obtained when the second image sensor performs sensing and sampling of a light emitting signal of the light emitting source.

2. The image synchronization device according to claim 1, wherein the sampling phase calibration circuit synchronizes the sampling phase of each of the first image sensor and the second image sensor with a light emitting phase of the light emitting source.

3. The image synchronization device according to claim 1, wherein the sampling phase calibration circuit comprises:
 a period setting circuit configured to set a light emitting period of the light emitting source to be identical to a sampling period of each of the first image sensor and the second image sensor;
 a sampling phase information generation circuit configured to calibrate the sampling phase of each of the first image sensor and the second image sensor in a manner that the first image sensor and the second image sensor perform sensing and sampling of the light emitting signal at different sampling phases, and thus generate sampling phase information for each sampling phase; and
 a sampling phase decision circuit configured to decide the sampling phase of each of the first image sensor and the second image sensor on the basis of the sampling phase information.

4. The image synchronization device according to claim 3, wherein the sampling phase information generation circuit sequentially increases or decreases the respective sampling phases.

5. The image synchronization device according to claim 1, wherein the delay calibration circuit comprises:
 a light emitting period calibration circuit configured to calibrate a light emitting period of the light emitting source; and
 a delay information detection circuit configured to detect delay information on the basis of a result of comparison between first light emitting period information and second light emitting period information, wherein the first light emitting period information is generated when the first image sensor performs sensing and sampling of a light emitting signal of the light emitting source operating at the calibrated light emitting period, and the second image information is generated when the second image sensor performs sensing and sampling of a light emitting signal of the light emitting source operating at the calibrated light emitting period.

6. The image synchronization device according to claim 5, wherein the sampling period of the first image sensor is identical to the sampling period of the second image sensor.

7. The image synchronization device according to claim 5, wherein the light emitting period calibration circuit calibrates the light emitting period of the light emitting source to be $2^N$ times (N being a natural number) a sampling period of each of the first image sensor and the second image sensor.

8. The image synchronization device according to claim 5, further comprising:
 a decision circuit configured to decide whether or not the delay calibration circuit will continue to perform a delay calibration operation, after the delay information detection circuit detects the delay information.

9. The image synchronization device according to claim 8, wherein the decision circuit generates a sampling period calibration continuation signal on the basis of the delay information.

10. The image synchronization device according to claim 8, wherein the light emitting period calibration circuit calibrates the light emitting period of the light emitting source to be different from a previous light emitting period on the basis of the sampling period calibration continuation signal.

11. The image synchronization device according to claim 10, wherein the light emitting period calibration circuit calibrates the light emitting period of the light emitting source to be double that of the previous light emitting period.

12. The image synchronization device according to claim 8, wherein the delay information detection circuit calibrates a delay of the first light emitting period information and a delay of the second light emitting period information on the basis of the delay information.

13. The image synchronization device according to claim 12, wherein:
 when the decision circuit decides to continue to perform the delay calibration operation, the delay information detection circuit generates temporary delay information by comparing the first light emitting period information having a calibrated delay with the second light emitting period information having a calibrated delay, and updates previous delay information to a sum of the previous delay information and the temporary delay information.

14. The image synchronization device according to claim 1, wherein the delay calibration circuit comprises:
 a sampling phase calibration circuit configured to calibrate a sampling period of each of the first image sensor and the second image sensor;
 a delay information detection circuit configured to detect delay information on the basis of a result of comparison between first sampling period information received from the first image sensor and second sampling period information received from the second image sensor, wherein each of the first and second image sensors operates at the calibrated sampling period.

15. The image synchronization device according to claim 1, wherein the sampling period calibration circuit calibrates the sampling period of each of the first image sensor and the second image sensor to be $\frac{1}{2^N}$ times (N being a natural number) the light emitting period of the light emitting source.

16. The image synchronization device according to claim 1, further comprising:
 a sensitivity calibration circuit configured to perform scaling or offset setting of at least one of the first image information and the second image information in such a manner that a maximum size of the first image information is identical to a maximum size of the second image information.

17. An image information generation apparatus comprising:
 a first image sensor and a second image sensor configured to respectively generate first image information and second image information;
 an image synchronization device configured to control the first image sensor and the second image sensor to respectively generate the first image information and the second image information using a light emitting source that emits light at intervals of a predetermined time, and synchronize a sampling phase of each of the first image sensor and the second image sensor with a light emitting timing of the light emitting source on the basis of the first image information received from the first image sensor and the second image information received from the second image sensor; and an image processor configured to process not only the first image information having the synchronized sampling phase, received from the first image sensor, but also the second image information having the synchronized sampling phase, received from the second image sensor, wherein the image synchronization device includes a delay calibration circuit configured to generate delay information on the basis of a result of comparison between the first image information generated from the first image sensor and the second image information generated from the second image sensor.

18. An image information generation apparatus comprising:
   a first image sensor and a second image sensor configured to respectively generate first image information and second image information;
   an image information storage circuit configured to store the first image information and the second image information;
   an image synchronization device configured to control the first image sensor and the second image sensor to respectively generate the first image information and the second image information using a light emitting source that emits light at intervals of a predetermined time, and generate delay information between the first image information and the second image information on the basis of a result of comparison between the first image information and the second image information; and
   an image processor configured to process the first image information and the second image information on the basis of the delay information.

19. The image information generation apparatus according to claim 18, wherein the image synchronization device comprises:
   a light emitting period calibration circuit configured to calibrate a light emitting period of the light emitting source;
   a delay information detection circuit configured to perform sensing and sampling of a light emitting signal of the light emitting source that emits light at intervals of the calibrated light emitting period, and thus detect the delay information on the basis of a result of comparison between first light emitting period information generated by the first image sensor and second light emitting period information generated by the second image sensor.

20. The image information generation apparatus according to claim 19, further comprising:
   a decision circuit configured to decide whether or not the image synchronization device will continue to perform a delay calibration operation, after the delay information detection circuit detects the delay information.

21. The image information generation apparatus according to claim 19, wherein the delay information detection circuit calibrates a delay of the first light emitting period information and a delay of the second light emitting period information on the basis of the delay information.

22. The image information generation apparatus according to claim 21, wherein:
   when the decision circuit decides to continue to perform the delay calibration operation,
   the light emitting period calibration circuit calibrates the light emitting period of the light emitting source to be different from a previous light emitting period; and
   the delay information detection circuit generates temporary delay information by performing comparison between the first light emitting period and the second light emitting period each having the calibrated delay on the basis of previous delay information, and updates previous delay information to a sum of the temporary delay information and the previous delay information.

23. The image information generation apparatus according to claim 18, wherein the image synchronization device comprises:
   a sampling period calibration circuit configured to calibrate a sampling period of each of the first image sensor and the second image sensor; and
   a delay information detection circuit configured to detect the delay information on the basis of a result of comparison between first sampling period information generated by the first image sensor and second sampling period information generated by the second image sensor, wherein the first sampling information is generated when the first image sensor performs sampling of light emitting information at the sampling period, and the second sampling information is generated when the second image sensor performs sampling of light emitting information at the sampling period.

* * * * *